Aug. 25, 1953 P. E. TRONQUIT 2,649,687
HYDRAULIC CONTROL FOR DEPTH OF AN IMPLEMENT
DRAWN BY A TRACTOR
Filed Sept. 8, 1949

INVENTOR
PIERRE ETIENNE TRONQUIT
BY
ATTORNEY

Patented Aug. 25, 1953

2,649,687

UNITED STATES PATENT OFFICE 2,649,687

HYDRAULIC CONTROL FOR DEPTH OF AN IMPLEMENT DRAWN BY A TRACTOR

Pierre Etienne Tronquit, Suresnes, France, assignor to Societe Française de Materiel Agricole et Industriel (Societe Anonyme), Vierzon, France, a French corporation Application September 8, 1949, Serial No. 114,531
In France June 27, 1949

5 Claims. (Cl. 60—52)

My invention deals with devices for the adjustment in height of implements, more particularly for agricultural implements, towed by tractors, and its special object is a hydraulic depth regulating device for such an implement, the control of which is brought about through the shifting of a single control-lever provided on the tractor.

To put it into more exact terms, the object of the invention is the provision of a single device for the control of a piston and cylinder motor provided on the tractor and acting on the carrying arms of an implement, such as a plough, so as to effect the raising or lowering or the holding of the implement in any required position, merely by shifting the control-lever to a given position.

The device includes, according to my invention, a mechanism connected to the control-lever and arranged with a shaft which is rotated by the piston and cylinder motor and a fluid control valve that sends the fluid coming from a pump, either to the piston and cylinder motor, or back to the tank; this device is constructed in such a way that when the piston and cylinder motor is in the inoperative position, the shifting of the lever involves a change of position in a push-rod acting on the fluid control valve in order to create a by-pass through which the fluid delivered by the pump returns to the tank and to open the valve controlling the sending of the fluid to the piston and cylinder motor, or in order to open the by-pass and the valve of the piston and cylinder motor to a greater extent so as to enable the fluid from the piston and cylinder motor to flow back to the tank more rapidly.

According to a further characteristic, the fluid control valve is made up of a body including a chamber into which emerges the oil inlet pipe and of which the upper portion is blocked off by a double valve controlling the delivery to the tank, while the lower portion is also shut off by a double valve controlling the discharge to the piston and cylinder motor; in addition, an axial push-rod arranged in the upper portion of the body enables the upper valve to be lifted from its seat, then, after the latter has traveled a certain distance, the lower valve is lifted.

According to another characteristic, the valve-lifter is housed inside a push-rod and is there subjected to the action of a spring drawing it to its position of maximum discharge opening, while the spring is regulated so that the effort exerted by it is slightly greater than that required in the piston and cylinder motor for holding up the implement.

A description will now be given of my invention with reference to the accompanying drawing that shows, as an example, an illustrative embodiment of the device and in which.

Figure 1:
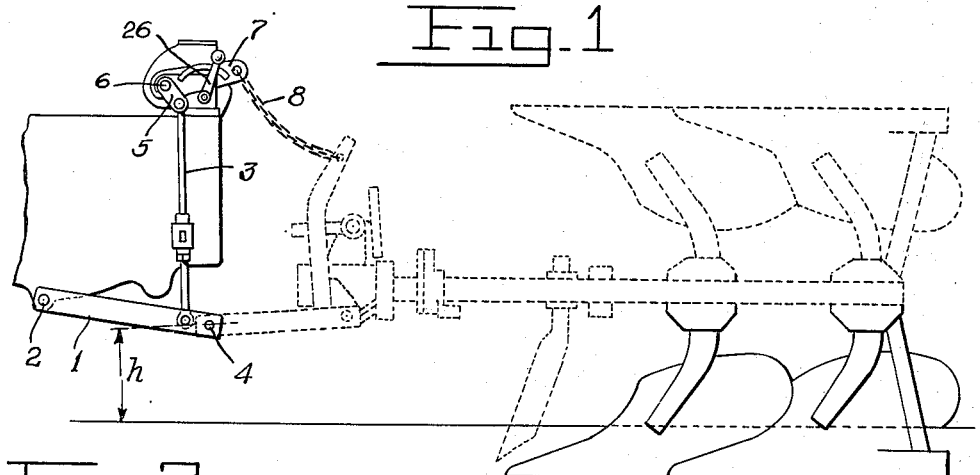
Figure 1 is a general diagrammatic view of the coupling mechanism.
Figure 3:
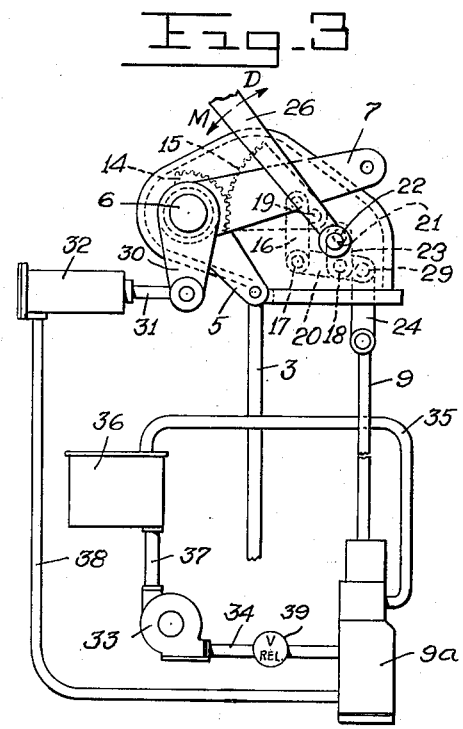
Figure 3 is an elevational view showing the complete hydraulic system and its controls constructed in accordance with the invention.

By referring to Figures 1 and 3, it will be seen that the coupling arrangement is made up of two arms 1 hinged to a fixed axle 2 of the tractor casing and held up by two rods 3. The implement is coupled at 4 and its height $h$ above the ground level regulates the working depth of the implement. The rods 3 are actuated by two cranks 5 fixed rigidly to an axle 6 controlled by the piston and cylinder motor 32 by means of the crank 30 and the piston rod 31. On this same axle 6 is keyed the crank 7 that raises the implement by means of a chain 8, that is stretched tight in its working position.

As already stated, the working of the piston and cylinder motor 32 for shifting the height of the implement is carried out through oil under pressure coming from a pump 33 mounted on the tractor, while the oil is sent to the piston and cylinder motor 32 by means of a fluid control valve 9a.

Figure 2:
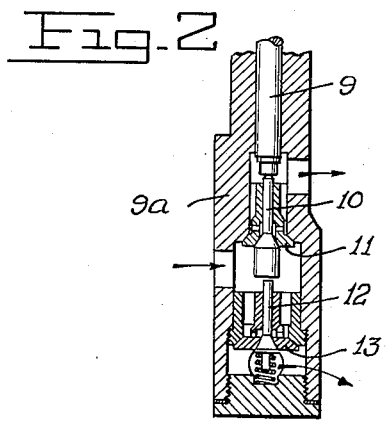
Figure 2 is a sectional view of the fluid control valve.

The latter is made up (see Figure 2) of a body provided with openings for providing communication through lines 34, 35 and 38 with the pump 33, the tank 36 and the piston and cylinder motor 32, respectively, as well as the valve seats; it is furnished with an upper double valve 10 and 11 shutting off the passage to the tank 36 and with a double non-return valve 12 and 13 shutting off the passage to the piston and cylinder motor 32. The tank 36 is connected to the suction side of the pump 33 by a pipe 37, and the pipe 34 is provided with a pressure relief valve 39. The valves are lifted from their seats by a push-rod 9. The valve 10 has a smaller travel and is used for the decompression of the pump 33 to a position held by the implement. The valve 11 enables the discharge delivery from the valve to be increased during the lowering of the implement (the delivery from the piston and cylinder motor 32 is then added to that from the pump 33). The valve 12 enables the lowering to be carried out slowly and the least amount of force is required for raising the valve 13 to provide for rapid lowering.

When working, the fluid control valve 9a assumes three main positions:

1. For lifting: the valve 10 is closed. The pressure from the oil delivered by the pump opens the valves 12 and 13 and the oil is headed towards the piston and cylinder motor.

2. For holding the implement in a fixed position, the valves 12 and 13 are closed. The valve 10 is opened. The pump delivers through the escape, at zero pressure.

3. For lowering: the valves 10 and 11 are opened. According to the position of valve 10, the valve 12 which permits slow lowering is opened, or the valves 12 and 13 are both opened, which permits lowering at a fast rate.

This fluid control valve 9a is controlled through a system of rods carrying the control-lever and connected to the piston rod of the piston and cylinder motor 32. This system of rods is shown in Figure 3. It is made up of a toothed sector 14, secured rigidly to the axle 6, that meshes with a second toothed sector 15, turning round the axle 19 and connected to the fluid control valve 9a through the rods 16, 20, 23 and 24. The control-lever 26 raises or lowers the rod 23 through an eccentric of which the centers are denoted at 21 and 22. A screw 27' enables the position of the valve-lifter 9 of the fluid control valve 9a to be adjusted.

This mechanism works in the following way:

1. *Lifting.*—Starting from a held position of the implement, the valve 10 (Figure 2) is kept open by the push-rod 9 and the pump runs idle. The control-lever is then shifted in the direction of the lifting up to a new position. The change in position of the lever causes the eccentric to turn which lifts the rod 23. The latter in the same way raises the rod 20 that turns round the axle 17 and raises the push-rod by means of the rod 24. With the push-rod raised, the valve 10 of the fluid control valve 9a closes and the oil then exerts a pressure in the fluid control valve 9a chamber, and lifts the valves 12 and 13 from their seats and reaches the piston and cylinder motor 32.

2. *Halting of the lifting movement.*—During the lifting movement, the sector 14 is rotated by the axle 6 and actuates the sector 15 that raises the rod 16. The rod 20 turns round the axle 18. The axle 17 is lifted while the axle 29 is lowered, thrusting on the push-rod that comes down again by means of the rod 24, and opens the valve 10 of the fluid control valve. The pump pressure drops to a figure less than that of the piston and cylinder motor. The valves 12 and 13 close again, halting the raising movement and hold the implement in its new position.

3. *Lowering movement.*—Starting from a held position of the implement, the valve 10 is opened. The lever is then shifted in the lowering direction, the result of which is to cause the lowering of the rod 23, actuating a movement of the rods 20 and 24 around the fixed axle 17, the push-rod 9 of the fluid control valve is pushed further downward, the valve 11 is raised from its seat, then the end of the valve 10 opens the valve 12 of the fluid control valve (for slow-motion lowering) and at the end of its travel likewise opens the valve 13 (for quick-motion lowering).

The weight of the implement then draws the piston and cylinder motor in the direction of the lowering movement, the latter acts on the shaft 6 and the sectors 14 and 15 so as to cause the axle 17 to come down and thus raise the axle 29. The latter lifts the push-rod which frees the valves 12 and 13, and the closing of the latter, under the action of the pressure from the piston and cylinder motor, halts the lowering of the implement.

It will be observed that without a special type of push-rod, the halting of the piston and cylinder motor after it has come up is carried out at an oil pressure corresponding to that required for holding up the weight of the implement.

Now it is necessary to obtain a gradual decompression during which the halting of the piston and cylinder motor is obtained for a pump pressure that is equal to or slightly greater than that required for the holding of the implement, and there must then be a fast dropping of the pump pressure until the pressure decreases to zero.

Figure 4:
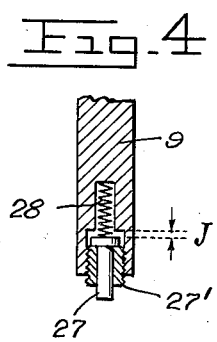
Figure 4 is an enlarged view of the push-rod of the fluid control valve.

For this purpose, the push-rod head 27 (see Figure 4) is supported by a spring 28 and its movement $j$ is adjusted by the screw 27'. If $p$ is the pressure required for holding the implement, the pressure to which it must be raised is $p'$ which is greater than $p$. The spring 28 is calibrated so as to balance a pressure exerted on the valve 10 that is slightly greater than $p$. When the push-rod comes in contact with the valve 10 on which is acting the pressure $p'$, the spring is compressed by the amount $j$, then the push-rod carries on with its travel, and the valve 10 lifts, thus opening the by-pass outlet in a gradual manner. The oil pressure, originally $p'$, decreases in proportion to the opening of the valve 10. When the pressure becomes suddenly lower than that balancing the spring 28 of the push-rod, the latter relaxes and opens completely the valve until the pump pressure is zero.

What I claim and desire to secure by Letters Patent is:

1. A hydraulic system for controlling the movements of a lifting and lowering mechanism comprising, in combination, pump means for providing a continuous supply of fluid under pressure, a fluid reservoir connected to the intake of said pump means, a multiple fluid control valve, means connecting the discharge end of said pump with said multiple valve, means connecting said valve with said reservoir, a piston and cylinder motor for actuating said lifting and lowering mechanism, and means connecting said motor with said multiple valve, said valve including a flow control valve normally held in closed position for controlling the flow from said multiple valve to said reservoir, a flow control valve normally held in closed position but actuatable by increased fluid pressure in said multiple valve for controlling the flow from said multiple valve to said piston and cylinder motor, push-rod means for positively actuating said first-named flow control valve, and means for moving said push-rod means into and out of engagement with said first-named flow control valve, said push-rod moving means being connected for actuation manually and by predetermined movement of said motor.

2. A hydraulic system for controlling the movements of a lifting and lowering mechanism comprising, in combination, pump means for providing a continuous supply of fluid under pressure, a fluid reservoir connected to the intake of said pump means, a multiple fluid control valve, means connecting the discharge end of said pump with said multiple valve, means connecting said valve with said reservoir, a piston and cylinder motor for actuating said lifting and lowering mechanism, and means connecting said motor with said multiple valve, said valve including a flow control valve normally held in closed position for controlling the flow from said multiple valve to said reservoir, a flow control valve normally held in closed position but actuatable by increased fluid pressure in said multiple valve for controlling the flow from said multiple valve to said piston and cylinder motor, said two flow control valves being in spaced co-axial alignment and said connecting means between the pump and the multiple valve being positioned to supply fluid between said flow control valves, push-rod means for positively actuating said first-named flow control valve, and means for moving said push-rod means into and out of engagement with said first-named flow control valve, said push-rod moving means being connected for actuation manually and by predetermined movement of said motor.

3. In a hydraulic system for controlling the movements of a lifting and lowering mechanism, in combination, a piston and cylinder motor for actuating said lifting and lowering mechanism and a multiple fluid control valve connected therewith for controlling the flow of fluid in the system, said valve including a flow control valve normally held in closed position for controlling the flow from said multiple valve to bypass said motor, a flow control valve normally held in closed position but actuatable by increased fluid pressure in said multiple valve for controlling the flow from said multiple valve to said piston and cylinder motor, push-rod means for positively actuating said first-named flow control valve, and means for moving said push-rod means into and out of engagement with said first-named flow control valve, said push-rod moving means including a pivoted rod connected at one end to said push-rod, link means actuated by said motor connected to the other end of said rod, and a hand-actuatable lever for shifting the pivot point of said rod.

4. In a hydraulic system for controlling the movements of a lifting and lowering mechanism, in combination, a piston and cylinder motor for actuating said lifting and lowering mechanism and a multiple fluid control valve connected therewith for controlling the flow of fluid in the system, said valve including a flow control valve normally held in closed position for controlling the flow from said multiple valve to bypass said motor, a flow control valve normally held in closed position but actuatable by increased fluid pressure in said multiple valve for controlling the flow from said multiple valve to said piston and cylinder motor, push-rod means for positively actuating said first-named flow control valve, and means for moving said push-rod means into and out of engagement with said first-named flow control valve, including a pivoted rod connected at one end to said push-rod, link means actuated by said motor connected to the other end of said rod, and a hand-actuatable lever for shifting the pivot point of said rod, said link means including a pivoted toothed sector having an arm connected to the end of said rod, and a second toothed sector in meshing engagement with said first-named sector and rotatable by said motor.

5. In a hydraulic system for controlling the movements of a lifting and lowering mechanism in combination, a piston and cylinder motor for actuating said lifting and lowering mechanism and a multiple fluid control valve connected therewith for controlling the flow of fluid in the system, said valve including a flow control valve normally held in closed position for controlling the flow from said multiple valve to bypass said motor, a flow control valve normally held in closed position but actuatable by increased fluid pressure in said multiple valve for controlling the flow from said multiple valve to said piston and cylinder motor, push-rod means for positively actuating said first-named flow control valve, and means for moving said push-rod means into and out of engagement with said first-named flow control valve, said push-rod moving means having an adjustable resilient valve engaging end.

PIERRE ETIENNE TRONQUIT.

References Cited in the file of this patent

UNITED STATES PATENTS

| Number | Name | Date |
|---|---|---|
| 2,361,326 | Silver | Oct. 24, 1944 |
| 2,399,756 | Mott | May 7, 1946 |
| 2,427,871 | Mott | Sept. 23, 1947 |
| 2,477,710 | Worstell | Aug. 2, 1949 |

FOREIGN PATENTS

| Number | Country | Date |
|---|---|---|
| 548,451 | Great Britain | Oct. 12, 1942 |
| 924,649 | France | Mar. 10, 1947 |